(12) United States Patent
Carteret et al.

(10) Patent No.: US 6,237,478 B1
(45) Date of Patent: May 29, 2001

(54) DEVICE FOR FORMING A GROOVE IN THE PERIPHERY OF A BALE AND PRESSING WRAPPING TWINE INTO THE GROOVE

(75) Inventors: Frédéric Carteret, Autrey les Gray; Claude Georget, Chargey les Gray, both of (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/358,186

(22) Filed: Jul. 20, 1999

(30) Foreign Application Priority Data

Aug. 17, 1998 (DE) .............................. 198 37 265

(51) Int. Cl.$^7$ .............................. B64B 13/24; A01F 15/07
(52) U.S. Cl. .................... 100/5; 56/341; 100/13; 100/88
(58) Field of Search .................... 100/5, 13, 88, 100/89; 56/341

(56) References Cited

U.S. PATENT DOCUMENTS

| | | | |
|---|---|---|---|
| 4,619,106 | * 10/1986 | van der Lely | 100/89 |
| 5,894,790 | * 4/1999 | Viaud | 100/5 |
| 5,941,166 | * 8/1999 | Geiser | 100/5 |
| 5,950,530 | * 9/1999 | Clauss et al. | 100/5 |

FOREIGN PATENT DOCUMENTS 41 32 664 A1    4/1993 (DE) .

OTHER PUBLICATIONS

U. S. Patent Application Serial No. 09/014,237 filed Jan. 27, 1998.

* cited by examiner

*Primary Examiner*—Stephen F. Gerrity

(57) ABSTRACT

A round bale press, for baling agricultural products, includes a pressing chamber that is circumferentially surrounded by compaction elements and a tying apparatus that lays twine onto the circumferential surface of a rotating bale formed in the pressing chamber of the baler, the twine being engaged between the rotating bale and the compaction elements and wrapped about the circumference of the bale. At least one pressing device is provided which includes at least one rotating pressing tool for engaging the circumference of the bale at a location where the twine that is wrapped about the bale is to be cut off when the desired number of wraps have been applied to the bale. The pressing tool operates to form a groove in the circumference of the bale and to guide the finishing wraps or wrap of twine to the vicinity of the groove so that the tension in the twine acts to seat the finishing wraps or wrap of twine in the groove prior to the wrapped length of twine being severed from the supply roll of twine.

11 Claims, 1 Drawing Sheet

DEVICE FOR FORMING A GROOVE IN THE PERIPHERY OF A BALE AND PRESSING WRAPPING TWINE INTO THE GROOVE

BACKGROUND OF THE INVENTION

The invention pertains to a round bale press with a pressing chamber, which is surrounded by compaction elements and with a tying apparatus that wraps twine on the circumferential surface of a rotating bale made in the pressing chamber, and in particular to apparatus for securing the loose end of the wrapped twine to prevent the twine from coming loose from the bale.

Conventionally, round bales are tied with twine in round bale presses in order to prevent the harvested crop from falling apart after it leaves the pressing chamber. The twine is only loosely wrapped on the peripheral surface of the bale with the end of the twine lying loose and untied. Therefore, it can happen that after ejection of the bale from the pressing chamber, depending on the turning direction of the bale, the twine becomes unwrapped and the bale falls apart, or that the loose end of the twine becomes an impediment to further handling of the bale.

DE-A-41 32 664, discloses two devices by means of which the twine end can be secured on the bale, one device acting to pressing the twine into the bale, and the second device acting to secure the twine in place with adhesive tape.

A German patent application, with file number 197 05 582.6, filed Feb. 14, 1997, and a corresponding U.S. patent application Ser. No. 09/014,237, filed Jan. 27, 1998, now U.S. Pat. No. 5,941,166, issued Aug. 24, 1999, show a round bale press with a slot shaper, attached to resist torsion, that, in close contact with the revolving bale, cuts a slot or groove into the circumferential surface of the bale in which the loose ends of the twine are held by a friction fit.

The problem with this invention consists in the fact that this method of securing the twine is relatively complicated.

SUMMARY OF THE INVENTION

According to the present invention, there is provided a novel structure for securing twine ends to a wrapped round bale.

An object of the invention is to provide a twine end securing device which operates to form a groove in the circumference of a bale in a location where the twine dispensing mechanism places the final wraps of twine so that at least the last of these final wraps enters the groove so that when this wrap is severed from the supply roll of twine the loose end section enters the groove and is frictionally retained there.

A more specific object of the invention is to provide a grooving and pressing device including a tool defined in part by at least one rotating element having fingers or teeth arranged about its circumference and projecting radially from its axis of rotation, the tool being located for constant engagement with and rotated by the circumference of a rotating bale being formed in the baling chamber, the rotating element acting to form a groove in the circumference of the bale at a location where the twine dispensing apparatus is designed to stop for applying several wraps of twine at the end of the tying cycle.

Still another object of the invention is to provide a grooving and pressing device, as set forth in one or more of the immediately preceding objects, which may be adjusted to various positions so that the rotatable grooving and pressing tool is in proper groove-forming relationship to a bale being formed, such adjustment in some cases being made to accommodate for different crops or crop conditions.

Yet another object of the invention is to provide a grooving and pressing device which includes twine guides for orienting the final wrap(s) of twine in alignment with the groove(s) formed in the circumference of the bale being wrapped.

These and other objects will become apparent from a reading of the ensuing description together with the appended drawings.

DESCRIPTION OF THE PREFERRED EMBODIMENT

Figure 1:
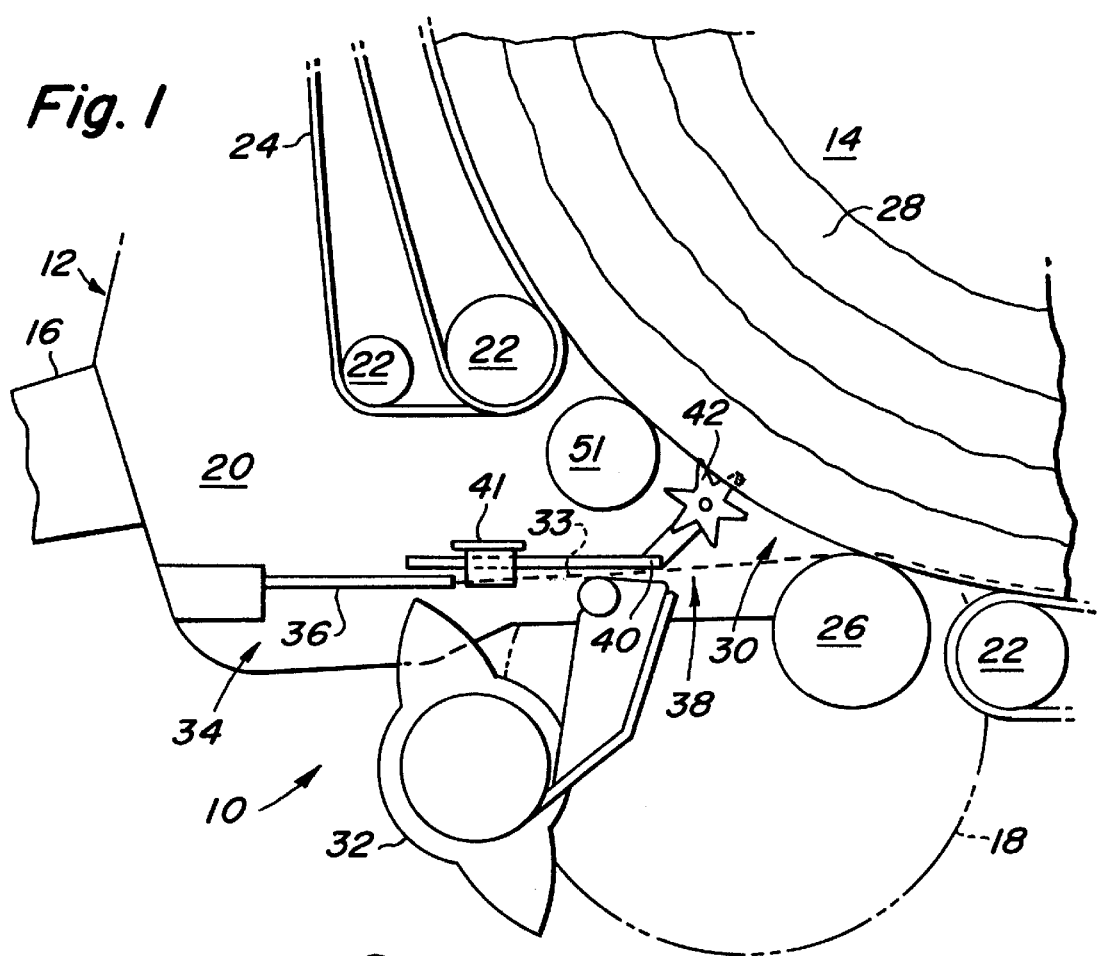
FIG. 1, is a schematic left side elevational view of a lower forward portion of a round bale press equipped with a tying apparatus and a twine end securing device, in the form of a grooving and pressing device made according to the invention.

Referring now to FIG. 1, there is shown a partial view of a round bale press 10 having a frame 12 that contains the pressing chamber 14 and is connected to a pulling vehicle, for instance, a tractor (not shown) via a tractor hitch 16 and is supported by wheels 18 above the ground.

The frame 12 is bordered on both sides by vertical side walls 20 that extend in the direction of travel and between which the tractor hitch 16 is contained.

A multitude of rolls 22 is located between the side walls 20, in this embodiment example, that drive compaction elements 24 by means of belts, as is customary. A crop inlet or opening 30, is located between the compaction elements 24 and a cylinder 26 in the lower left area, at the bottom of the drawing, the cylinder serving to support a bale 28, formed in chamber 14. Crop material is picked up from the ground by a pick-up device (not shown), transported through the crop inlet 30 and into the chamber 14, by means of an overshot conveyor 32, and then rolled into a cylindrical bale 28.

There is no inescapable need to configure a round ball press 10 with compaction elements 24 in the form of belts. Rather, the pressing chamber 14 can also be delimited by means of rotatable rolls with their turning axes located on the circumference of a circle. Aside from this, chain-link rod conveyors can be used as compaction elements that are moved on a preset or modifiable path. Finally, also, combinations of belts, chain-link rod conveyors, and rolls can be used.

Between the tractor hitch 16 and conveyor 32 located underneath it, a twine dispensing apparatus 34 is provided with the help of which twine 33, only tentatively shown in drawing, is taken from a supply roll and brought to the circumference of the rotating bale 28, enabling the bale to pick it up. The twine dispensing apparatus 34 contains at least one twine guide or tube 36 formed at the end of a twine dispensing arm, as is customary, that is swingable within a predominantly horizontal plane between a position distant from the bale 28 to a position close to the bale 28. It is advantageous if, at the end of the twine wrapping cycle or process, the twine guide 36 assumes a position at an end of the bale. However, any other position, for instance, in the middle, is also possible. Twine dispensing apparatus 34 can also be installed in a different area, for instance, in the upper or rear area of the round bale press 10, these different locations being possible with baling chambers of different designs having openings to the baling chamber sufficient for permitting twine to be introduced at the different locations.

With the twine dispensing apparatus 34, a cutting device (not shown) is associated that cuts the twine 33 between the supply roll and the bale 28, as soon as enough twine 33 has been wrapped. This cutting device is conventionally configured and positioned so that the twine strand or twine strands are routed between an anvil and a cutting blade and are cut at a certain moment toward the end of the wrapping process. The round bale press 10 preferably includes controls which determine this moment in such a manner that cutting will not happen before enough twine 33 has been wrapped on the bale 28.

Here it is noted that the compacting elements 24 are a plurality of belts mounted in side-by-side relationship on the support rolls 22, leaving only a small gap, for instance, 5–10 mm, between them.

In the embodiment disclosed, a twine end securing device in the form of a grooving and pressing device 38 is mounted at a level below the hitch 16 at a location forwardly of the inlet 30. The grooving and pressing device 38 includes an arm 40 supporting a grooving and pressing tool 42 that can rotate around a horizontal axis. For practical operation, the arm 40 is held in a firm position by a bushing-shaped holder 41 in a lateral region of the round bale press 10.

Figure 2:
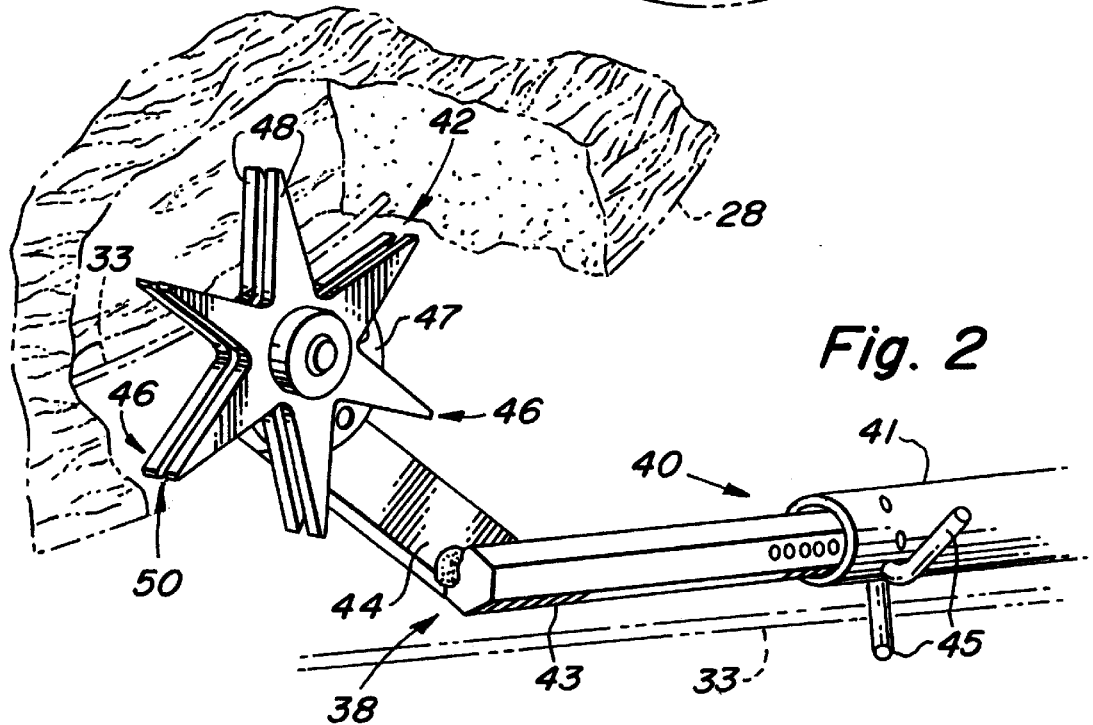
FIG. 2, is a perspective view of the grooving and pressing device shown in FIG. 1.

Referring now also to FIG. 2, it can be seen that the grooving and pressing tool 42 is here shown defined by a multi-component star-shaped wheel including two individual star-shaped wheels 46. The individual star-shaped wheels 46 are attached, as by an axle, to a selected one of a plurality of holes provided in a circular pattern in a disk 47 that is rigidly attached to the arm 40. The axle establishes an essentially horizontal axis about which the wheels 46 rotate. By positioning the supporting axle in different ones of the holes in the disk 47, the position of the grooving and pressing tool 42 relative to the surface of the bale 28 is changed.

The individual star-shaped wheels 46 feature finger-shaped or ray-shaped spikes or protrusions 48, and are attached, spaced apart, so as to maintain between them a groove or slot 50 for receiving a final wrap or wraps of the twine. While one might consider a rounded configuration of the spikes 48 of the star-shaped wheels and varying configuration of the wheels themselves, experience has shown that it is advantageous to configure the spikes to be as pointed as possible and to select a radius for the star-shaped wheels of 140 mm. The arm 40 extends straight into the pressing chamber 14 and features a first part 43, that extends longitudinally beneath a starting roll 51, and a second holding part 44 that is firmly mounted, as by welding, on and the first part 43 in an upwardly and rearwardly angled position so as to place the grooving and pressing tool 42 in a position as close as possible to the starter roll 51 of the round bale press 10. The grooving and pressing tool 42, in this case the star-shaped wheels 46, are located so that they penetrate at least partially into the circumferential surface of the bale 28.

The grooving and pressing tool 42 is designed to be adjustable relative to the pressing chamber 14, to suit varying crops like silage, hay and straw. With a softer crop material such as silage, stronger pressing may be required. This can be accomplished by means of, for instance, shifting the grooving and pressing tool 42 farther in the direction of the bale 28. With harder crop material it can suffice to press the twine against the bale with less force, for which purpose the distance between the grooving and pressing tool 42 and the bale 28 can be widened by shifting or swiveling the grooving and pressing tool 42.

The desired adjustments are accomplished by the following described structure. Specifically, the first part 43 of the arm 40 is attached by means of the holding device 41 that is configured as a tube so as to allow the first part 43 to be shifted longitudinally within it, as soon as safety devices (not shown) are detached that could be configured as, for instance, shear pins or bolts that fit into matching holes in the first part 43 and the holder 41. Due to the first part 43 being configured with a hexagonal profile and to the holding device 41 having a matching internal hexagonal profile, the first part 43 can be attached in a multitude of positions to holding device 41, which allows variation of the position of the axis of rotation of the star wheels 46 of the grooving and pressing tool 42 from a centered position with the axis extending parallel to the axis of rotation of the bale 28 to other positions where the axis is tilted one way or the other relative to is centered position. Of course, further adjustment of the star wheels 46 relative to the surface of the bale 28 is made possible by selecting different ones of the perforations of the disk 47 for the mounting of the axle of the wheels 46.

Holding device 41 exhibits twine guides 45 that have been configured as pins that between them define a gap which is generally aligned with the end of the twine tube 36 and through which the twine 33 is routed when the twine tube 36 is located in an end position of the twine dispensing cycle.

Although it is preferred not to complicate the structure from that of the preferred embodiment depicted in the drawings, it is feasible to configure the twine end securing device 38 in such a way that it would not extend into the pressing chamber 14 during the wrapping process and that it would be brought into the pressing chamber only in the final phase or after completion of the wrapping process, for instance, by swiveling it in or by pushing it in along a linear guiding element. The swiveling or shifting movement of the grooving and pressing device 38 could also be controlled by the diameter of the bale so that, from a certain bale size on, the grooving and pressing tool 42 would interface with the bale 28. For this purpose an actuator can be provided that adjusts the grooving and pressing device 38 mechanically, hydraulically or pneumatically. Such an actuator is, for instance, disclosed in the above-identified German patent application 197 05 582.6.

In the event that several loose twine ends need to be secured in several locations along the circumference of the bale 28, several grooving and pressing devices 38 can be used that are spaced from each other along the length of the bale 28 respectively at the several locations.

Operation

Based on the aforementioned design the following functions of the round bale press 10 result, in accordance with the invention.

As soon as a bale 28 has reached the desired or maximal size within pressing chamber 14, the twine dispensing apparatus 34 is switched on automatically or manually and the twine guide 36 routes the twine end or twine ends to the rotating bale 28 that catches it/them and thus initiates the wrapping process. During the wrapping process, the twine guide 36 moves along the longitudinal axis of the bale 28. As the bale forms and during the wrapping process, the grooving and pressing tool 42 is caused to rotate by the movement of the bale 28, and runs over the circumferential surface of the bale, pressing a groove (not shown) into the bale by means of its protrusions 48. Since the grooving and pressing tool 42 is configured as a multiple star-shaped wheel, the groove is formed by the individual star-shaped wheels 46, which means, in the disclosed embodiment, that it actually consists of a pair of individual grooves that are located in close side by side relationship to each other and that have been respectively formed by the pair of star-shaped wheels 46. Since these individual grooves are close together, it can be considered that only one groove exists since the tension in the twine will break down the crop material located between these individual grooves. The term "groove", therefore, means a groove in the surface of the bale 28 that is not precisely defined, does not have sharp edges, and is formed by material that is depressed relative to the other material of the bale surface.

Upon completion of the actual wrapping process, the twine guide 36 moves in the direction of side wall 20 of the round bale press 10 into a region where the grooving and pressing device 38 is located, and stops there.

The twine 33 passes between the guides 45 that are attached to holding device 41, in the direction of the grooving and pressing tool 42 so that the twine 33 is positioned on the bale 28 in fore-and-aft or longitudinal alignment with the gap between the guides 45 so that the twine is at least in the vicinity of the groove formed by the tool 42 and, after circumscribing the bale will be in the vicinity of the recess or gap 50 defined between the projections 48 of the separate star wheels 46 of the tool 42. This is facilitated by the fact that the twine 33 is under tension. Grooving and pressing tool 42 thus acts to route the twine 33 into the groove in the circumferential surface of the bale 28. Of course, if the final wrap or wraps of twine is/are not exactly located between the star wheels 46, but pass instead beneath the wheels themselves, the latter will act to press the twine into the groove. The crop material pressed down by the tool 42 or by the individual star-shaped wheels 46 has the tendency to return to its original position and, accordingly, the twine 33 is held in the groove in the circumferential surface of the bale 28 by the friction between itself and the material forming the bale 28, as well as by the stalks that are trying to return to their original position.

When sufficient twine 33 has been introduced onto the bale 28, the cutting device (not shown) of the twine dispensing device 34 is actuated and the twine 33 is cut. The bale 28 is then ejected from the pressing chamber 14.

In order to adjust the grooving and pressing device 38 to varying conditions or requirements of different crop material such as, for instance, silage, hay, or straw, several adjusting possibilities are provided at the grooving and pressing device 38. The position of grooving and pressing tool 42 can be varied by selecting different ones of the holes of in the perforated disk 47 for the mounting of the supporting axle of the star wheels 46. In addition, the pressing and grooving tool 42 can be moved by shifting arm 40 within holder 41 toward or away from the bale 28, by which action the impression pressure of the pressing tool 42 on the bale 28 can be varied. The angular position of the grooving and pressing tool 42 can be changed by inserting arm 40 into holder 41 in differing positions, i.e., by swiveling it around its longitudinal axis.

Thus, it will be appreciated that the grooving and pressing device 38 is of a simple, versatile construction which operates to effectively secure twine ends in grooves formed in the circumference of the bale 28.

What is claimed is:

1. In combination with a round bale press including a pressing chamber having its circumference bounded by pressing elements that define an inlet to the chamber, and a twine dispensing apparatus for dispensing twine for being wrapped around the circumference of a rotating bale formed within the pressing chamber and including a primary twine guide having a discharge end adapted for being positioned, at the end of a wrapping cycle, at a location for delivering a length of twine for being wrapped at least once about a preselected region of the bale, a twine securing apparatus, comprising: a grooving and pressing device mounted adjacent said inlet at said location and having at least one grooving and pressing tool mounted in said inlet for rotation about a transverse axis and having an outer periphery positioned for being contacted and rotated by a bale formed within the pressing chamber, with said tool being configured for forming a groove in the circumferential surface of said bale in longitudinal alignment with the primary twine guide discharge end when the latter is at said location, whereby twine dispensed from said twine guide will enter said groove in the circumferential surface of the bale.

2. The combination defined in claim 1, wherein said grooving and pressing device includes at least one longitudinally extending arm to which the grooving and pressing tool is attached in a manner that allows it to rotate about said transverse axis.

3. The combination defined in claim 2 wherein said arm is provided with a secondary twine guide for routing twine, dispensed from said primary twine guide when the latter is in said location, toward the groove formed in the circumference of the bale by said grooving and pressing tool.

4. The combination defined in claim 2 wherein said arm is mounted for longitudinal adjustment for adjusting the amount that the grooving and pressing tool extends into the baling chamber.

5. The combination defined in claim 2 wherein said arm includes a longitudinally extending straight section mounted for adjustment around a longitudinal axis of said straight section for disposing the axis of rotation of the grooving and pressing tool at various attitudes relative to the horizontal.

6. The combination defined in claim 2 wherein said pressing elements define said inlet at a lower forward location of said pressing chamber and include a starter roll located adjacent an upper side of said inlet; said arm including a straight section joined to an upwardly and rearwardly angled section with said straight section extending generally horizontally below said starter roll and said angled section projecting upwardly behind said starter roll; and said grooving and pressing tool being mounted to a rear end of said angled section.

7. The combination defined in claim 1, wherein said outer periphery of said grooving and pressing tool includes a pair of transversely spaced peripheral portions extending outwardly from said transverse axis for creating a groove having a predetermined depth and defining a gap therebetween having a radial dimension at least equal to said predetermined depth, whereby said peripheral portions are adapted for straddling said at least one wrap of twine once it is located in said groove.

8. The combination defined in claim 7 wherein said periphery of said grooving and pressing tool is defined by a plurality of transversely spaced pairs of fingers.

9. The combination defined in claim 1 wherein the grooving and pressing tool includes at least two individual star-shaped wheels.

10. The combination defined in claim 9 wherein the individual star-shaped wheels are spaced transversely from each other so as to form a gap between them.

11. The combination defined in claim 1 wherein said arm includes a mounting element provided with a plurality of mounting holes located at different distances from the pressing chamber, and said grooving and pressing tool being selectively mountable in the mounting holes so as to adjust the amount that the grooving and pressing tool projects into the pressing chamber.

* * * * *